UNITED STATES PATENT OFFICE.

BENJAMIN KEPNER, OF CRANFORD, NEW JERSEY.

PROCESS OF MAKING RUBBER AND LEATHER SUBSTITUTE.

1,174,734. Specification of Letters Patent. Patented Mar. 7, 1916.

No Drawing. Application filed March 7, 1913, Serial No. 752,757. Renewed August 12, 1915, Serial No. 45,267.

*To all whom it may concern:*

Be it known that I, BENJAMIN KEPNER, a citizen of the United States, residing at Cranford, in the county of Union and State of New Jersey, have invented new and useful Improvements in Processes of Making Rubber and Leather Substitute, of which the following is a specification.

The object of the present invention is the production of a substance which can be used as a substitute for rubber and leather, and which shall be of a good quality, strong, tenacious, and of any desired degree of hardness.

If desired, a product as soft and flexible as kid may be produced, or if desired, a product as hard and stiff as horn can be produced, by various modifications herein stated, or any desired gradations between the soft and pliable product, and the hard and horn-like product may be made.

For making my product, I preferably proceed as follows: Gelatin, in any of its forms, such as sheet gelatin, isinglass, glue, animal, vegetable or marine gelatin, etc., is first treated with cold water, for a sufficient length of time to cause the gelatin to soften, by absorption of water, (or in other words to swell), until it has absorbed sufficient water for the purpose intended. (Gelatin will, under these conditions, absorb up to thirteen times its own weight of water.) The excess of cold water is then poured off, and the softened gelatin is then heated in a water bath, nearly to boiling until the gelatin completely dissolves, and forms a solution of a syrupy consistency. To this solution while hot is added glycerin, of common purity and substantially free from water, equal to about 12 to 25% of the weight of the dry gelatin employed, and more if a soft rubber-leather is being made, and the mixture thoroughly stirred. There is also added approximately the same amount (12 to 25%) of oil, (such oils as French degras or linseed being preferred, although other oils, particularly those used in treating leather, may be employed.) The mixture is again thoroughly stirred. To the solution is then added 6 to 12% of pure tannin (more or less as with the glycerin and oil), to gelatins that will not be precipitated thereby, such as vegetable gelatins. If the gelatin is of a character to be precipitated by pure tannin, an extract (aqueous) of sumac, in equivalent amount, should be substituted for the pure tannin. "European tannin" that is generally used in the manufacture of white leather, should be employed, instead of a tannin that produces a dark color. The solution is then thoroughly mixed, while hot, and allowed to stand and cool for 24 hours or longer, during which time the liquid will resolve itself into a gelatinous mass. This may be again heated in the water bath, to cause it to liquefy after which it may be used for coating or impregnating fabrics, or for molding, as described further on.

As a modified mode of procedure, suitable for the preparation of this solution, the gelatin solution is precipitated with tannin. After the precipitation is complete, the water is poured off, and the precipitate, remaining in a tough elastic mass is now, while still wet, dissolved in hot glycerin in a water bath (boiling). Acetic acid and oil are added, and then thoroughly mixed while hot. The mixture allowed to cool and season for 24 hours or more, when it is ready for application to fabrics or otherwise.

The solution, prepared by either of the above methods, may be poured while hot, into molds, or on plates, to form articles, either with or without any fillers, *e. g.* cotton waste, wool and leather waste, pulp, sawdust, etc., such articles being then cut into appropriate sizes, shapes, etc., for further use in the arts, if desired.

Another method of working up this solution into useful articles, is to impregnate fabrics, to make various articles. If the fabric is in the form of a woven or knitted tube, I can by this method make such articles as tubes, fire or garden hose, automobile tires or casings therefor, etc., which in addition to being impregnated with the liquid and dried, may have any desired number of coatings of the liquid rubber-leather on both the inside and outside thereof.

The material constituting my invention can be produced in various colors, by applying any suitable coloring material in liquid form, to the dried fabric that has been impregnated or coated with it, after which it is again dried, or coloring material may be mixed with the rubber-leather while in a liquid state, and applied to the fabric or nearly every desired color may also be produced, by applying the liquid rubber-leather to fabric or other material that has been previously dyed. Light or white color may also be produced, in the same manner, except that in that case, I make the rubber-leather as transparent or translucent as possible so that the colors will show through it.

A method of making an especially strong and tough leather substitute, useful for a variety of purposes, e. g. as shoe soles, and uppers, is as follows: Two pieces of cloth are soaked in the solution, united by pressing, so that the warp of one piece is laid across the warp of the other piece, and after drying other layers of fabric may be similarly applied, or surface coatings of the liquid may be applied, until the desired thickness is obtained. This process may also be applied to a single piece of cloth, or thin leathers.

Twine, cordage, ropes, cables, etc., can be saturated and coated with the rubber-leather, adding strength, durability and water-proof properties to them, making it specially desirable when they are used in water, and cold climates, as they will not absorb water, and freeze, if so treated.

The drying of the various articles should preferably be carried out, by loosely piling or hanging the articles in an open room, in the presence of sunlight, at a temperature not above 120°F., and when so dried is not in any manner injured. Heating to higher temperatures will injure the material, and reduce its strength. The presence of sunlight is necessary to cause the desired reactions to take place during the drying operation. Also when an ordinary glossy finish is desired (similar to patent leather) add any suitable gloss giving material to the rubber-leather solution. The gloss can also be applied to the finished fabric and dried. It may also be observed that the gloss, when made part of the rubber-leather articles, can easily be cleaned and brightened up by simply rubbing them with a greasy cloth, and then with a dry cloth. After the surface of the rubber-leather has been cleansed, this rubber-leather acts and looks like patent leather.

The hardness of the product may be increased, if desired, by further treatment with tannin solution, and again drying in the manner above set forth. If the material is too hard for a particular use, it may be made softer by soaking in water, preferably warm water, after which oils, or glycerin such as above specified, are rubbed into the surface. The material is then again dried as above stated.

The proportions of glycerin, oil, tannin, etc., may be varied more or less, as above stated. Increasing the amount of oil and of glycerin, and decreasing the amount of tannin makes the product softer, and vice versa.

Two properties of special interest, in addition to those above noted, are that the material is a good insulator for electricity, and does not become brittle with age, as does rubber, nor is it rotted by oil as is rubber, thus adapting it especially in connection with greasy machinery, such as buffers, packings, etc.

This substance can be used for impregnating fabrics to produce articles other than those above indicated, which may be used in various arts where substantially water-proof fabrics are needed. By suitably preparing these articles, they can be made of any desired thickness, flexibility, strength, toughness, resiliency and impermeability.

While I have specified gelatin, as being used in making the composition, it is to be understood that this term is intended to include, not only what is known in the market as "gelatin" but any known substance which has similar properties, as well as any of the known equivalents therefor, such as glue, isinglass, vegetable jelly, agar-agar, and others.

This material is obviously much cheaper and in many ways superior to rubber or leather, and is destined to come into very extended use in the arts.

What I claim is:—

1. A process of increasing the softness and flexibility of gelatin derivatives, which comprises treating the same with water, and while in a moist condition applying oil to the surface thereof.

2. A process of producing a rubber leather substitute, which comprises treating a fabric with a solution comprising glycerin, gelatin, an oil, and tannin and thereafter drying said treated fabric in the presence of sunlight at a temperature not over 120° F., and thereafter increasing the softness and flexibility of said product, by treating the same with water, and while in a moist condition applying oil to the surface thereof.

In testimony whereof I affix my signature in presence of two witnesses.

BENJAMIN KEPNER.

Witnesses:
SALLIE H. BURNLEY,
CHAS. W. BURNLEY.